United States Patent [19]

Samardzija

[11] Patent Number: 4,853,507
[45] Date of Patent: Aug. 1, 1989

[54] APPARATUS FOR MICROWAVE SEPARATION OF EMULSIONS

[75] Inventor: Nikola Samardzija, Wilmington, Del.

[73] Assignee: E. I. Dupont de Nemours & Company, Wilmington, Del.

[21] Appl. No.: 187,667

[22] Filed: Apr. 28, 1988

[51] Int. Cl.[4] .............................................. H05B 6/78
[52] U.S. Cl. ..................... 219/10.55 A; 219/10.55 F; 210/708; 210/748
[58] Field of Search ............... 219/10.55 A, 10.55 R, 219/10.55 F, 10.55 M, 10.65, 10.51; 431/11; 210/708, 748

[56] References Cited

U.S. PATENT DOCUMENTS

| Re. 31,241 | 5/1983 | Klaila | 431/11 |
|---|---|---|---|
| 2,894,228 | 7/1959 | Geisler | 333/98 |
| 2,944,231 | 7/1960 | Howell et al. | 333/31 |
| 3,092,514 | 6/1963 | Tomberlin | 134/1 |
| 3,307,010 | 2/1967 | Püschner | 219/10.55 F |
| 3,668,358 | 6/1972 | Stenstrom | 219/10.55 A |
| 3,748,421 | 7/1973 | Peterson | 219/10.55 A |
| 4,067,683 | 1/1978 | Klaila | 431/11 |
| 4,582,629 | 4/1986 | Wolf | 252/348 |
| 4,673,782 | 6/1987 | Koepke et al. | 219/10.55 A |

OTHER PUBLICATIONS

Institution of Electrical Engineers publication entitled "Industrial Microwave heating", A. C. Metaxas & R. J. Meredith, pp. 225, 226.

Primary Examiner—Philip H. Leung

[57] ABSTRACT

Apparatus for de-emulsification of liquids using microwave energy as radiated into an applicator section of characteristic frequency dimensions consisting of a wave guide section that has a taper applicator element of low dielectric constant material separating the wave guide section into a radiation input void end and a larger volume liquid-filled output end; whereby emulsion under pressure is input to the wave guide section output end adjacent the applicator element to undergo radiation and convection heating and subsequent separation into constituent components.

17 Claims, 3 Drawing Sheets

APPARATUS FOR MICROWAVE SEPARATION OF EMULSIONS

BACKGROUND OF THE INVENTION

1. Field of the Invention

The invention relates generally to the separation of emulsions and dispersions by heating with microwave energy and, more particularly, but not by way of limitation, it relates to an improved apparatus for separation of liquids wherein emulsions are irradiated by microwave energy through a confining applicator disposed within a wave guide whereupon rapidly heated emulsion is extracted for separation.

2. Description of the Prior Art

The basic teaching and disclosure of the separation of emulsions using microwave energy is disclosed in U.S. Pat. No. 4,582,629 in the name of Wolf as issued on Apr. 15, 1986. The Wolf patent explored microwave radiation of such oil/water emulsions and established data relative to viscosity versus microwave exposure time and the further relationship to temperature. Simple laboratory apparatus was used for microwave exposure of the emulsions and certain test blank specimens. U.S. Pat. No. 2,894,228 is considered for its teaching of microwave heating apparatus in general which uses a circular ceramic window to separate the load end of an empty wave guide at atmospheric pressure from an excited end containing a vacuum. Another U.S. Pat. No. 2,944,231 teaches the use of wave guide short-circuiting stubs with overlying sections of dielectric material shaped as wedges or cones to provide impedance matching structure for non-liquid containing wave guides. This particular form of impedance matching device using the short-circuited stub is generally well-known.

The U.S. Pat. No. 3,092,514 in the name of Tomberlin teaches a microwave wave guide heating apparatus for crude oil. This invention utilizes two concentric and coaxially positioned wave guides wherein the inner wave guide introduces microwave energy into the outer wave guide which also functions as a flow conduit for crude oil to be heated. Finally, the U.S. Pat. No. 4,067,683, now reissue 31,241, in the name of Klaila teaches apparatus for microwave heating of hydrocarbon material for the purpose of improving its fluency, thus inherently breaking an emulsion. This patent teaches a container or tank for containing the oil/water emulsion whereupon the microwave radiation is directed into the tank or hydrocarbon containing structure. There is no concept of heating the heavy fluid within the confines of a wave guide section. It may be noted that the reissue subject matter contemplates the directing of microwave energy downhole for interaction in a geological substrate, a concept which is quite far removed from contemplation of the present invention.

SUMMARY OF THE INVENTION

The present invention relates to apparatus for efficient microwave heating of emulsions or dispersions in order to separate into liquid components at relatively high rates of speed. The invention comprises an applicator whose confines essentially amount to a section of wave guide of preselected dimension which receives microwave energy input at one end for interaction through a fluid-tight, variable impedance matching wall while receiving input of the emulsion or dispersion into the microwave path and flowing microwave treated emulsion or dispersion out the opposite end for subsequent settling or separation of the liquids. The impedance matching membrane is formed from a low dielectric material and is physically formed in any of several basic, tapered configurations in order to best present impedance matching surfaces to the microwave energy passing into the liquid-filled end of the wave guide section.

Therefore, it is an object of the present invention to provide a highly efficient apparatus for separation of emulsions and dispersions.

It is yet another object of the invention to provide de-emulsifier apparatus that is simple and compact and requires little space as for use in offshore operations.

It is also an object of the invention to provide a selective heating apparatus for emulsions and dispersions that utilizes microwave energy having a relatively wide band width property.

It is still further an object of the present invention to provide a selective heating apparatus for multi-phase liquid that is highly efficient yet economical in operation.

Finally, it is an object of the present invention to provide microwave heating apparatus for separation of oil/water emulsions that is highly efficient in operation and can be safely left unattended for long periods of time.

Other objects and advantages of the invention will be evident from the following detailed description when read in conjunction with the accompanying drawings which illustrate the invention.

DETAILED DESCRIPTION OF THE INVENTION

Figure 1:
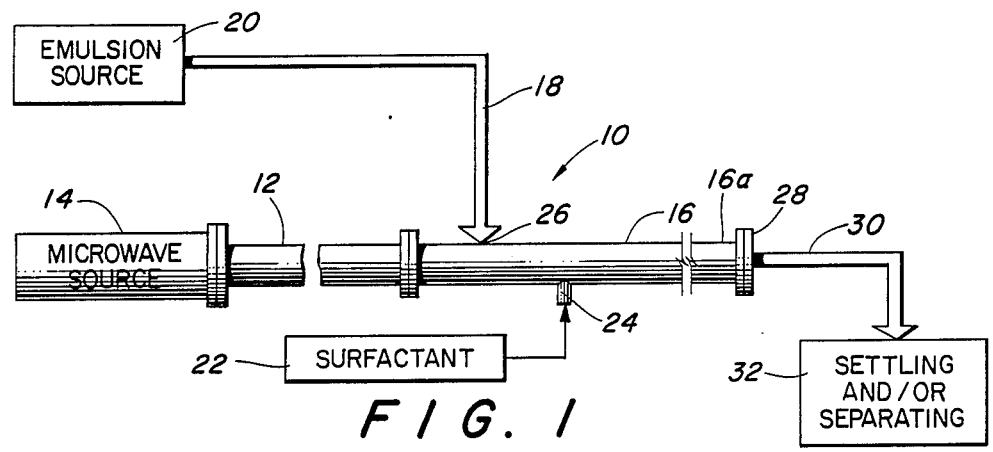
FIG. 1 is an illustration in idealized block form of apparatus constructed in accordance with the present invention.

FIG. 1 illustrates a microwave treatment apparatus 10 of a type that utilizes circular wave guide sections 12 conducting microwave energy from a microwave source 14 to the input end of an applicator section 16 formed to the identical dimensions as wave guide sections 12. The applicator section 16 receives input via flow way 18 of a selected emulsion or liquid dispersion from an emulsion source 20. A selected surfactant from a source 22 is also input through a connector nipple 24 into the applicator 16. The surfactant input connector 24 is located at a selected distance downstream from the input 26 of flow way 18, as will be further described, and a shorting plate 28 is secured over the end of applicator 16 while providing an output conduit 30 to a settling tank 32 or the like.

The microwave source 14 is selected from commercially available types that operate within the frequency set by the MSI standards, i.e., Medical Science and Industrial Standards, as established by the Federal Communications Commission. In accordance with these standards, microwaves of 915 megahertz and 2450 megahertz have been selected. Thus, a 915 Mhz, 50 KW microwave power supply together with a circulator and a water load may be obtained from Microdry Company in San Ramon, Calif. This microwave source is then employed in the apparatus 10 to heat such as a flowing oil/water emulsion from emulsion source 20 to facilitate breakdown and separation into its constituent parts while lessening the need for large quantities of surfactants as input at connector 24. The applicator's ability to heat rapidly large mass flows of emulsions to obtain and enhance settlement rates makes microwave treatment particularly suitable for use at oil production sites where storage facilities are limited, but power availability is not, i.e., offshore. Since less surfactants are used with microwave treatment, the environmental impact is likewise reduced when the contaminating residuals are discharged into the earth or sea.

Figure 2:
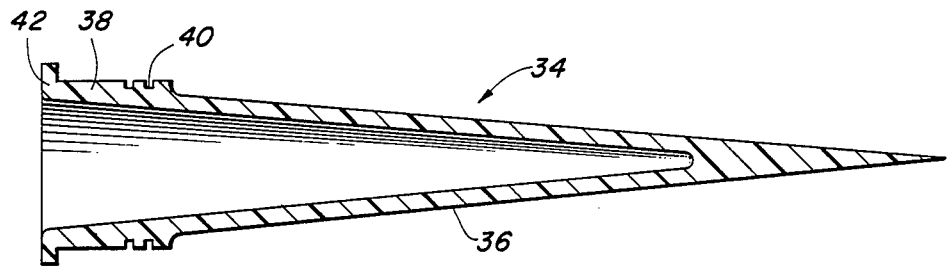
FIG. 2 is a view in vertical section of a cone-type applicator element.
Figure 3:
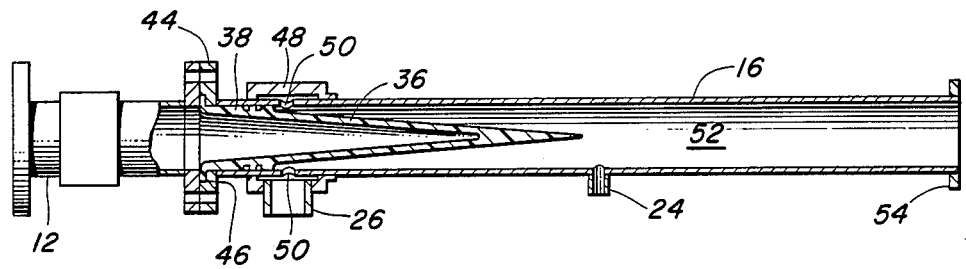
FIG. 3 is a view in partial vertical section of the cone-type applicator element as installed in a circular wave guide section adapted for emulsion separation.

The wave guide applicator section 16 utilizes an applicator element 34 as shown in FIGS. 2 and 3. The applicator element 34 consists of an elongated cone 36 which is formed of a suitable dielectric material, e.g., quartz, silicone rubber, Teflon ® or the like, these materials having a relatively low dielectric constant. Applicator cone 36 is further formed unitarily to include a base liner collar 38 having a plurality of O-ring grooves 40 and an end flange 42 to enable secure seating within the applicator wave guide section 16. Thus, the front end wave guide flange 44 (FIG. 3) includes an annular shoulder 46 for receiving flange 42 as the applicator element 34 is inserted within wave guide section 16 in secure positioning.

A circumferal distribution jacket 48 is secured around the outer surface of applicator wave guide 16 adjacent the O-ring portion of applicator cone 36 for connection to input 26 from flow way 18 (FIG. 1). Liquid from emulsion source 20 is then applied under pressure through apertures 50 in the wall of wave guide section 16 into the interior 52 of applicator wave guide section 16. Surfactant from source 22 may also be input in selected amounts through connector nipple 24, and the shorting plate 28 and output conduit 30 are connected to a final flange 54 at a selected length along applicator wave guide 16.

The length of the wave guide applicator section 16 will vary in accordance with operating conditions. The standard wave guide section is four feet long and an applicator is made up of a first section 16 having the applicator element plus additional sections 16a as needed to optimize the length and provide requisite energy absorption. That is, once impedance matching is achieved at the applicator element, e.g., element 34, the wave guide length must be sufficient to absorb the energy without reflection at the shorting plate 28. Since water is a good microwave energy absorber and oil is not, a high water content emulsion, e.g., 80 percent water, will require shorter length, e.g., two to three $\lambda g$ lengths; however, with an oil/water emulsion having on the order of three percent water, much longer length is required and two or three additional wave guide sections 16a must be added before receiving the shorting plate 28.

In operation, emulsion from source 20 (FIG. 1) is input through distributor jacket 48 under selected pressure into the interior 52 and a selected amount of surfactant is input via nipple 24. The irradiating microwave energy from source 14 is then applied via wave guide 12 through the impedance matching cone 36 whereupon rapid heating takes place adjacent the outer cone walls as the liquid proceeds to the exit end at flange 54 and through the shorting plate 28. The cone-type applicator element 34 is capable of functioning with good efficiency without the necessity for a phase shifter or iris, as will be further described below. In addition, the cylindrical shape makes the cone type of applicator more effective for high pressure applications and a unit such as that of applicator wave guide 16 has been tested at up to 70 psi. The cone-type of applicator element 36 enables a great increase in band width and this, in turn, renders the heating performance of the system quite insensitive to variations in the percent water makeup of the emulsion or dispersion. The cone-type applicator element 34 has excellent power transfer efficiency over a very wide range of water concentrations.

Figure 4:
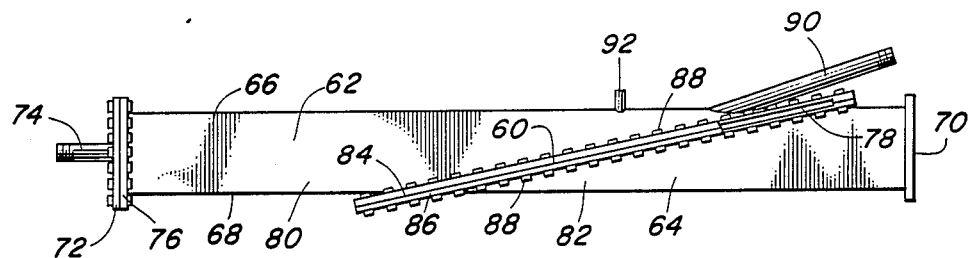
FIG. 4 is a side view in elevation of an H-taper type of applicator element.
Figure 5:
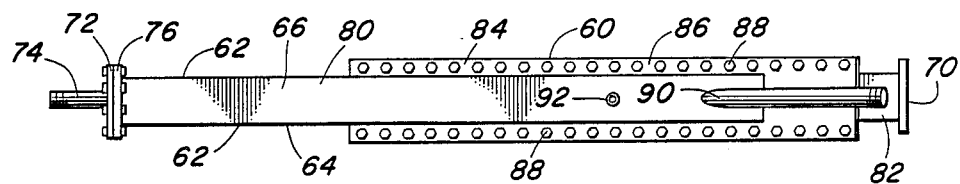
FIG. 5 is a top plan view of the applicator element of FIG. 4.

An alternative type of applicator section may be constructed utilizing a conventional form of rectangular wave guide utilizing wedge-type applicator elements. FIGS. 4-8 illustrate alternative forms of the wedge-type applicator element. FIGS. 4 and 5 illustrate an H-taper applicator element 60 which is disposed diagonally across the more broad dimension (wall 62) of the rectangular wave guide 64. Thus, the applicator element 60 extends diagonally as a transversal between the narrow wave guide walls 66, 68 defining alternate interior angles as a function of the microwave frequency, in this case about 15-20 degrees. Microwave energy is input at a first end 70 while a shorting plate 72 with outlet conduit 74 is secured over a distal end flange 76.

The H-taper impedance matching element is formed from a panel 78 of low dielectric constant material such as silicone rubber or Teflon ®. In order to secure the dielectric panel 78, the wave guide section 64 is formed in two parts 80 and 82 having respective angularly matched flanges 84 and 86, each of which has countersunk facing for receiving the dielectric panel 78 therein for securing a fixture by a large plurality of bolts 88. Input of liquid emulsion or dispersion is via a tube 90 directed to flow liquid along the distal side of the dielectric panel 78 within the pressurized, liquid-filled wave guide portion 80. Surfactant may be input via a connecting nipple 92 which is preferably disposed a short distance along wave guide edge 66 from the input of tube 90, e.g., positioning of about 12 inches allows good input function.

The H-taper applicator element 60 serves to couple the exciting microwave energy from the empty wave guide portion 82 into the tandemly arranged liquid-filled wave guide section 80. The applicator element 60 is so designed as to pass the H-field component in the cross-guide direction while smoothly changing the E-field strength in the axial direction, i.e., normal to the cross-guide direction. The angle of the applicator element 60 or the taper length is typically greater than 2 λg in order to obtain smooth impedance matching where 2 λg is equal to 2 times the matching wavelength of the wave guide characteristic frequency. The H-taper applicator section of FIGS. 4 and 5 is employed in similar manner as the circular wave guide section shown in FIG. 1, as will be further described below.

Figures 6, 7:
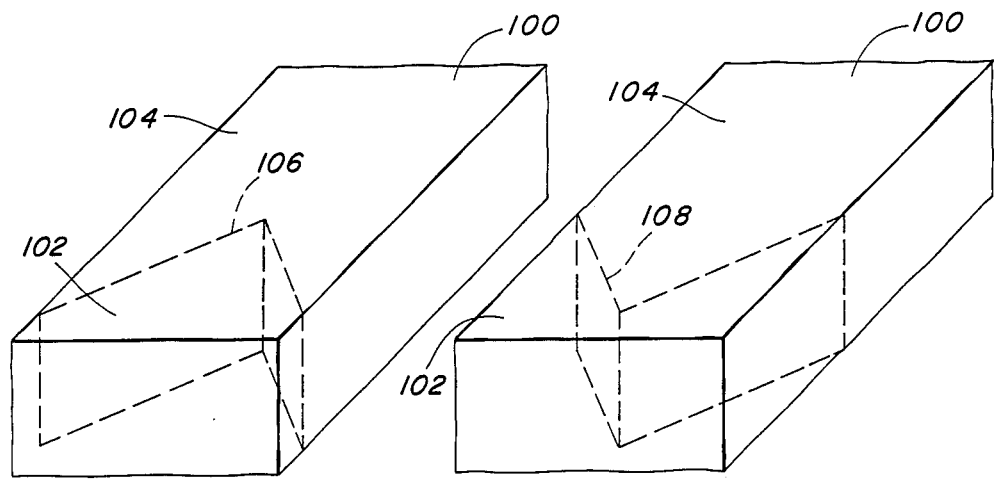
FIG. 6 is a schematic drawing of a wave guide section with an arrowhead taper type of applicator element.
FIG. 7 is a schematic view of a section of wave guide with a swallow tail taper applicator element shown in dash lines.

Still other forms of tapering dielectric material configuration may be selected for impedance matching application of microwave energy to the liquid-filled side of a wave guide section. FIG. 6 illustrates in generally schematic form a rectangular wave guide 100 having an air-filled input section 102 separated from a liquid-filled wave guide section 104 by an arrowhead taper applicator element 106. The arrowhead taper applicator element 106 also functions to pass the H-field component in the cross-guide direction while smoothly changing the E-field strength in the axial direction. The taper length of the two sides of arrowhead 106 should also be greater than the 2 λg distance in order to obtain smooth matching. FIG. 7 illustrates a swallow tail configuration for the applicator element 108 as disposed across a similar type of wave guide 100 and the impedance matching function of applicator element 108 is similar to that of applicator 106 except that the dielectric/free space boundaries are in reverse order. Here again, the H-field component extends in the cross-guide direction with smoothly changing E-field strength in the actual direction. The height or length of the arrowhead applicator element 106 and the swallow tail applicator element 108 will also be dependent upon the operating microwave frequency and dimensions of the characteristic frequency of the wave guide 100.

Figure 8:
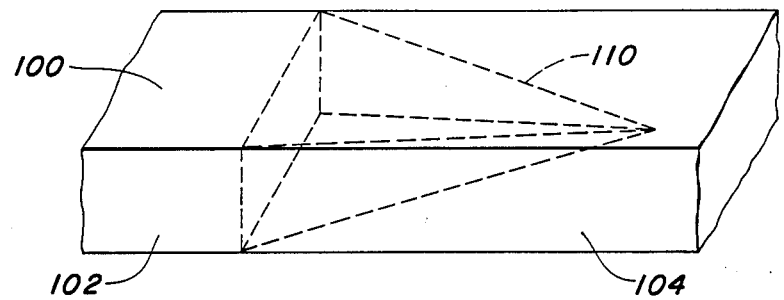
FIG. 8 is a schematic diagram of a section of wave guide having a pyramid taper type applicator element shown in dash lines.

FIG. 8 illustrates yet another wedge-type applicator element, a pyramidal applicator element 110 which is mounted in the rectangular wave guide 100 and functions to perform impedance matching function. The pyramidal applicator element 110 is an equi-angular pyramid of requisite height or length which is formed from the low dielectric constant material. This type of applicator element 110 has the higher compressive strength characteristic, similar to the cone applicator element of FIGS. 2 and 3, and is able to withstand somewhat more pressure differential as between the empty wave guide section 102 and the liquid-filled wave guide section 104. Thus, generally speaking, it indicates that enablement of higher pressure input into the wave guide section 104 adjacent pyramidal applicator element 110 will allow significantly greater liquid through-put per unit time. In the impedance matching configuration, the dielectric/free space boundary configuration relative to pyramidal applicator element 110 is formed as a concentric rectangle window and the dispersion and impedance characteristic relationships are somewhat more complicated than those for the more simple wedge/type taper applicator elements.

Figure 9:
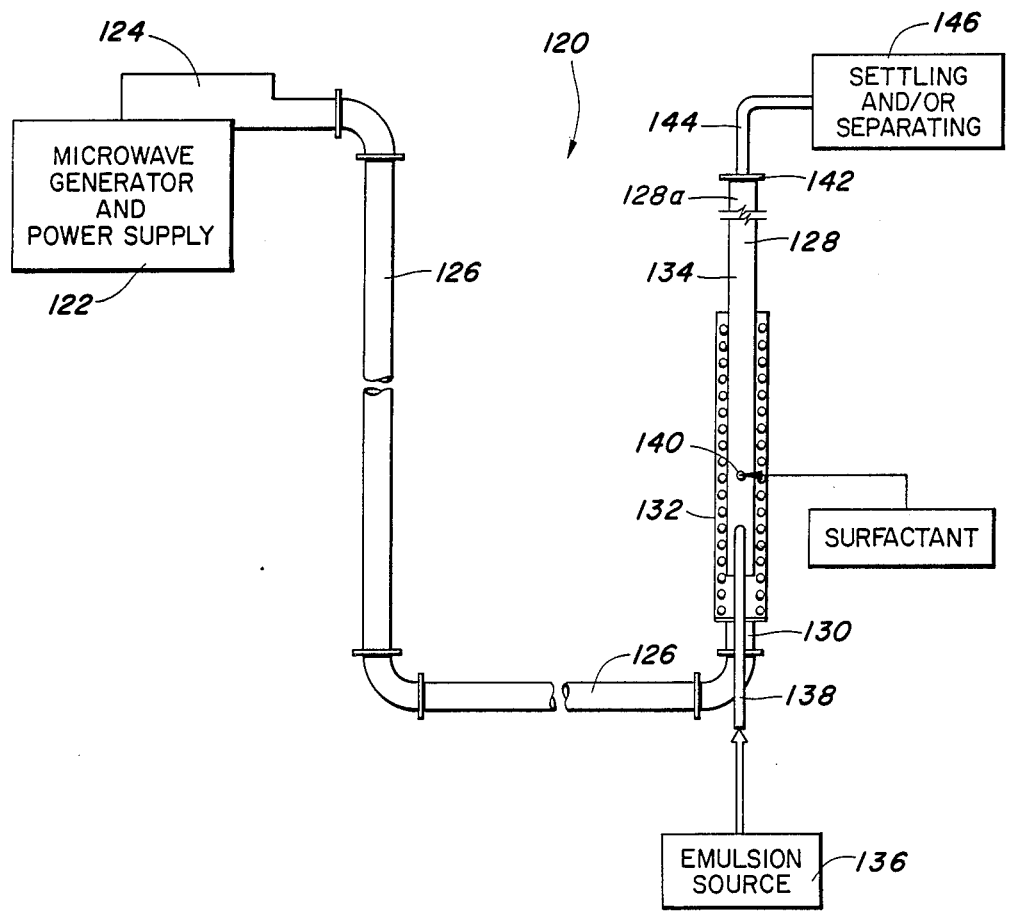
FIG. 9 is a block diagram of liquid treating apparatus utilizing the H-taper type of applicator element as shown in FIGS. 4 and 5.

FIG. 9 illustrates a de-emulsifier apparatus 120 utilizing a selected form of microwave generator 122, preferably 915 megahertz or 2450 Mhz, as it provides microwave output through a suitable phase shifter 124 to a characteristic frequency wave guide 126. The wave guide 126 may be such as the type WR-340 or type WR-975, depending upon selection of basic microwave operating frequency. The wave guide 126 is connected into a de-emulsifier applicator section 128, e.g., of the type shown and described with respect to FIGS. 4 and 5 above.

The applicator section 128 includes an empty or void end 130 that is directly connected to receive microwave energy input from wave guide 126, and this section is separated by an H-taper applicator element 132 (e.g., Teflon ® panel 60 of FIG. 4) from a liquid-filled section 134. A suitable emulsion or liquid dispersion from an emulsion source 136 is then applied via diagonal entry tube 138 for flow along the low dielectric constant applicator element 132 as a surfactant of suitable type and quantity is input via connector 140. A shorting plate 142 including exit tube 144 then closes off an upper end applicator wave guide section 128a. It is generally preferred that the applicator section be installed in the upright section, as shown in FIG. 9, in order to diminish the possibility of air pockets and other variables in the processing. The microwave irradiated fluid is then flowed out exit tube 144 to a final settling tank 146 or other disposition.

In operation, microwave generation is commenced and delivered via wave guide 126 through the void guide section 130 on to the H-taper applicator element 132. At the same time, the emulsion or liquid dispersion is applied through feed tube 138 at selected increased pressure to be flowed along the applicator element 132 in the liquid-filled section 134 of applicator section 128. The emulsion flows under pressure, e.g., 15 psi, into the upper section 134 of wave guide section 128 and, in order to maximize heat transfer, flow is first directed along the surface of the Teflon ® membrane of the applicator element 132 where it receives the primary dielectric heating effect whereupon it moves to the outlet port or exit tube 144 at the top of the applicator section 128 while receiving heat by convection.

The microwave energy is attenuated as it propagates through the applicator element 132 and section 128 and for a voltage standing wave ratio (VSWR) of unity there is a 100% power transfer efficiency, i.e., all power from the microwave generator is absorbed by the emulsion within the upper section 128. For higher VSWR values of 1.3 and 2, the power transfer efficiency is on the order of 98 and 89 percent, respectively.

It has been clearly shown that the H-taper applicator such as that of applicator guide 128 is minimally sensitive to water variations in the emulsion. Testing has shown that the H-taper exhibits better than 90% (2 VSWR) power transfer efficiency for emulsions with 50% water. However, as the percentage of water drops below 15% one needs to re-adjust the applicator's operating point and this may be achieved by a phase shifting of the microwave as at phase shifter 124. Such adjustment may be done either by an operator or an automated phase shifter, one form of which is shown and described in a patent application Ser. No. 187,678 concurrently filed herewith and entitled "Automated Microwave Tuning System for De-emulsifier Systems".

When operating the de-emulsifier system 120 at 915 Mhz and 50 KW input power, it has been demonstrated that the system successfully heats 15 gallons per minute emulsion flow to over 100° F. from a lower ambient temperature with or without surfactant additions to achieve 95% oil/water separations within 15 minutes settling time. There is indication too that the 915 Mhz applicator systems provide much better power handling capability and higher emulsion through-put than do the higher frequency systems at 2450 Mhz.

Since the tapered applicator elements in both the rectangular and the circular wave guides provide broad band matching of the input power to the liquid-filled portion of the applicator section, severe variations in water content, e.g., 2-3% to as much as 90% by weight, can be tolerated without creating severe changes in reflected power levels. With the cone and pyramid applicator elements one can dispense altogether with expensive energy circulators in connection with the applicator design.

The foregoing discloses a novel form of apparatus for separating certain forms of emulsion or liquid dispersion using microwave energy. The microwave applicators of the present apparatus may be employed variously with either circular or rectangular wave guides of any selected dimensions, depending upon the selection of microwave energy frequency to be utilized and the authority for its use with respect to certain utilities. Prior experimentation indicates that the apparatus of the present invention can be used quite effectively for dispersal of a number of different liquid mixtures at a high rate of liquid through-put with relatively little expense and considerable safety.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for emulsion separation, comprising:
    a microwave energy source of pre-selected frequency;
    a wave guide section of selected length dimensioned in accordance with the wavelength of said microwave frequency, and having first and second ends with said microwave energy input at the first end;
    an impedance matching member for increasing the microwave energy power transfer, said member being secured across said wave guide section in liquid-tight affixture to divide the wave guide section into a lesser volume space adjacent the first end and a greater volume space adjacent the second end;
    means for flowing emulsion liquid into said greater volume space adjacent said impedance matching member to receive microwave heating; and
    second means for flowing microwave treated emulsion liquid out of the second end for liquid separation.

2. Apparatus as set forth in claim 1 which further includes:
    means for flowing surfactant material into said wave guide section greater volume space.

3. Apparatus as set forth in claim 1 wherein:
    said impedance matching member is formed from a low dielectric constant material.

4. Apparatus as set forth in claim 3 wherein:
    said low dielectric material is polymerized tetrafluoro ethylene.

5. Apparatus as set forth in claim 3 wherein:
    said dielectric material is selected to obtain a voltage standing wave ratio of two or less at the interface between lesser and greater volumes of the wave guide section.

6. Apparatus as set forth in claim 1 which is further characterized in that:
    said wave guide section is a circular wave guide; and
    said impedance matching member is a hollow conical member formed of low dielectric constant material and having the apex directed into the wave guide greater volume.

7. Apparatus as set forth in claim 6 which further includes:
    means placing said emulsion liquid under increased pressure in said means for flowing.

8. Apparatus as set forth in claim 6 wherein said second means for flowing comprises:
    a shorting plate having an outlet conduit secured across said wave guide section at a preselected position therealong.

9. Apparatus as set forth in claim 1 which is further characterized in that:
    said wave guide section is a rectangular wave guide; and
    said impedance matching member is a flat panel disposed diagonally across the wave guide relative to the magnetic field orientation.

10. Apparatus as set forth in claim 9 wherein:
    the flat panel is formed of low dielectric constant material and is secured in transversal relative to the short dimension sides of the rectangular wave guide.

11. Apparatus as set forth in claim 10 which further includes:
    means placing said emulsion liquid under increased pressure in said means for flowing.

12. Apparatus as set forth in claim 10 wherein said second means for flowing comprises:
    a shorting plate having an outlet conduit secured across said wave guide section at a preselected position therealong.

13. Apparatus as set forth in claim 1 which is further characterized in that:
    said wave guide section is a rectangular wave guide; and
    said impedance matching member is a wedge-shaped panel having equal sides and being disposed across the wave guide in the plane of magnetic field orientation with the wedge point directed toward the wave guide section greater volume.

14. Apparatus as set forth in claim 1 which is further characterized in that:
    said wave guide section is a rectangular wave guide; and
    said impedance matching member is a wedge-shaped panel having equal sides and being disposed across the wave guide in the plane of magnetic field orientation with the wedge point directed toward the wave guide section lesser volume.

15. Apparatus as set forth in claim 1 which is further characterized in that:
    said wave guide section is a rectangular wave guide; and
    said impedance matching member is a pyramid formation with the base similar to the cross-section of the wave guide and the vertex directed toward the greater volume.

16. Apparatus as set forth in claim 1 which further includes:
    means placing said emulsion liquid under increased pressure in said means for flowing.

17. Apparatus as set forth in claim 1 wherein said second means for flowing comprises:
    a shorting plate having an outlet conduit secured across said wave guide section at a preselected position therealong.

* * * * *